United States Patent [19]

Hara et al.

[11] Patent Number: 5,493,357
[45] Date of Patent: Feb. 20, 1996

[54] LENS DRIVING DEVICE

[75] Inventors: Minoru Hara, Tokyo; Toshifumi Nakano, Sagamihara, both of Japan

[73] Assignee: Olympus Optical Co., Ltd., Tokyo, Japan

[21] Appl. No.: 304,811

[22] Filed: Sep. 13, 1994

Related U.S. Application Data

[63] Continuation of Ser. No. 1,267, Jan. 7, 1993, abandoned.

[30] Foreign Application Priority Data

Jan. 10, 1992 [JP] Japan .................................. 4-003360

[51] Int. Cl.$^6$ ................................... G03B 1/18
[52] U.S. Cl. ................... 354/195.12; 354/195.1
[58] Field of Search .................. 354/195.12, 195.1

[56] References Cited

U.S. PATENT DOCUMENTS

| | | | |
|---|---|---|---|
| 4,445,757 | 5/1984 | Enomoto et al. | 354/195.12 |
| 4,812,727 | 3/1989 | Sakai et al. | 318/696 |
| 4,814,812 | 3/1989 | Nakajima et al. | 354/412 |
| 4,851,869 | 7/1989 | Ishimara et al. | 354/195.1 |
| 4,857,951 | 8/1989 | Nakajima et al. | 354/400 |
| 4,929,804 | 5/1990 | Kawai et al. | 200/5 A |
| 4,931,823 | 6/1990 | Nakajima et al. | 354/412 |
| 4,945,372 | 7/1990 | Higuchi et al. | 345/199 |
| 4,978,989 | 12/1990 | Nakano et al. | 354/413 |
| 5,019,765 | 5/1991 | Ogasawara | 354/195.12 |
| 5,241,335 | 8/1993 | McIntyre | 354/195.12 |

FOREIGN PATENT DOCUMENTS

| | | |
|---|---|---|
| 47-37733 | 2/1972 | Japan . |
| 55-133021 | 10/1980 | Japan . |
| 61-144801 | 7/1986 | Japan . |
| 62-112111 | 5/1987 | Japan . |
| 62-155791 | 7/1987 | Japan . |

Primary Examiner—Michael L. Gellner
Assistant Examiner—Eddie C. Lee
Attorney, Agent, or Firm—Frishauf, Holtz, Goodman, Langer & Chick

[57] ABSTRACT

A camera lens driving device of the present invention drives the lens at a constant speed while pressing force applied to an operating member by the operator is below a predetermined value and controls the lens driving speed according to pressing force after it exceeds the predetermined value. The lens driving device comprises a photo-taking lens, an actuator for driving the lens, an operating member for specifying a direction in which the lens is to be driven, a pressing force detector for detecting pressing force applied to the operating member to produce a variable output, and a drive controller responsive to an output of the pressing force detector for outputting a drive signal to the actuator. The drive controller includes first and second comparators and a drive signal output circuit. In response to the operating member being pressed the pressing force detector outputs a drive control signal to the drive controller. When pressing force to the operating member lies within the range from a first to a second predetermined value, the drive controller drives the lens at a low constant speed through the actuator. When the pressing force is increased to exceed the second predetermined value, the drive controller changes the driving speed of the lens according to the pressing force applied to the operating member.

56 Claims, 14 Drawing Sheets

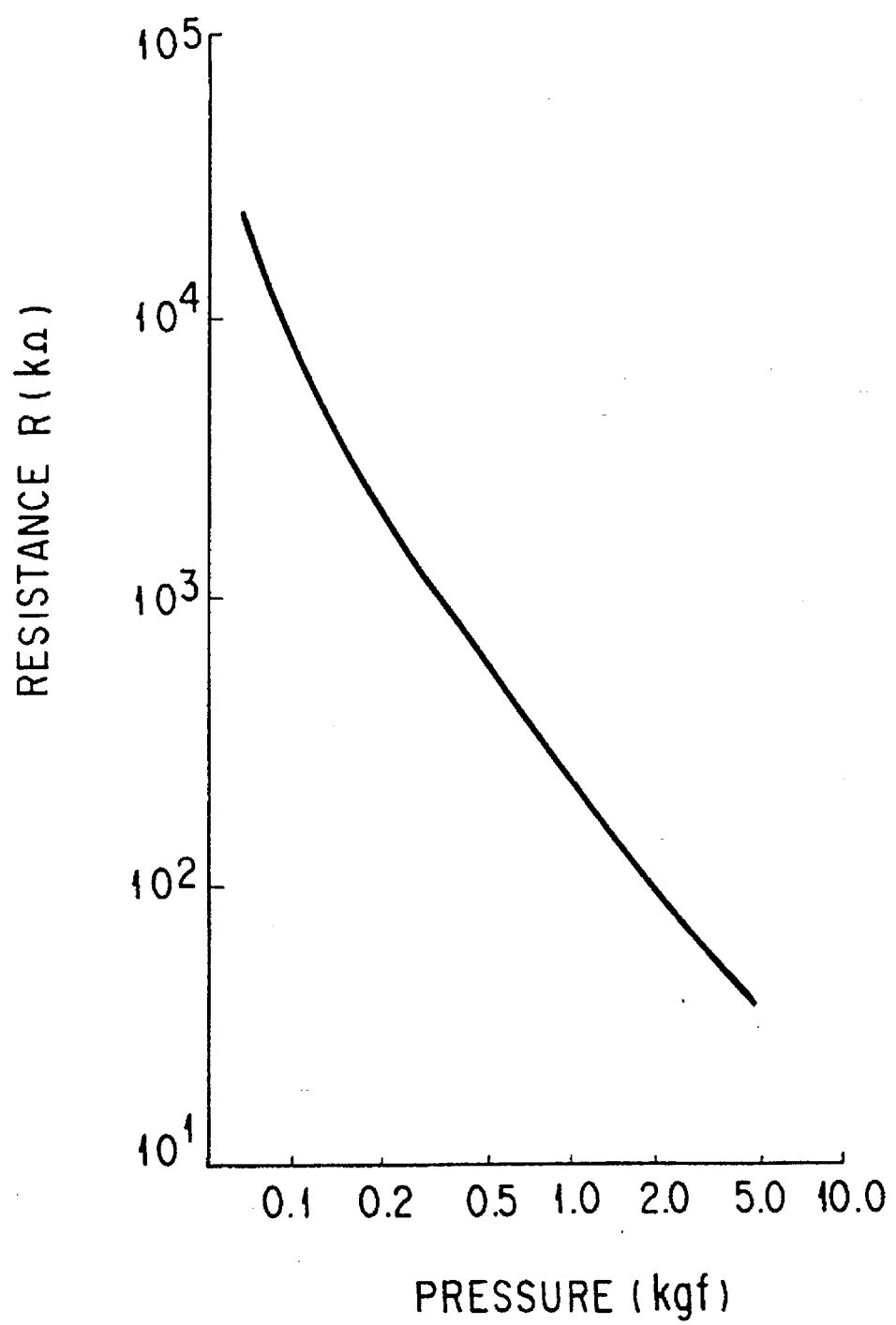
F I G. 2

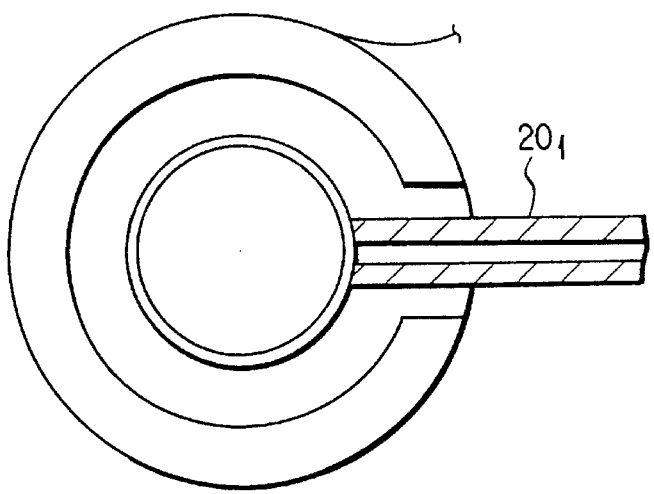
F I G. 3A
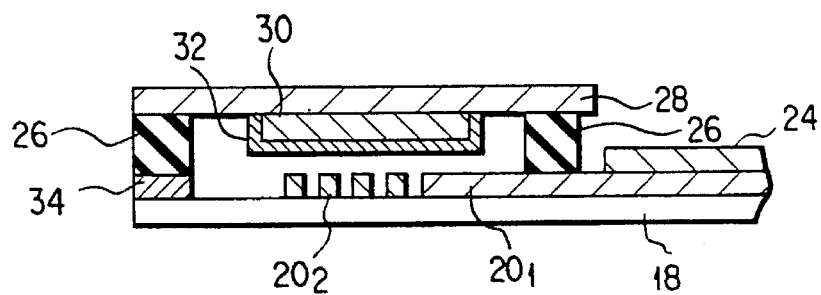
F I G. 3B
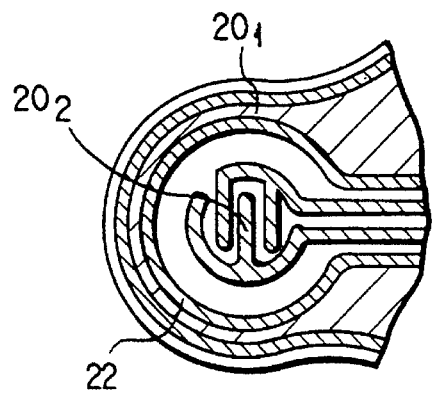
F I G. 3C

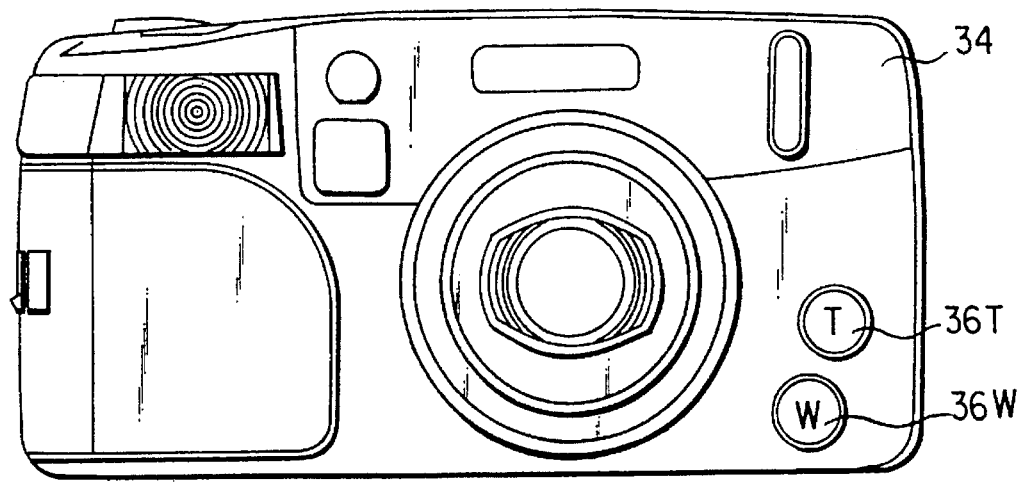
F I G. 4A
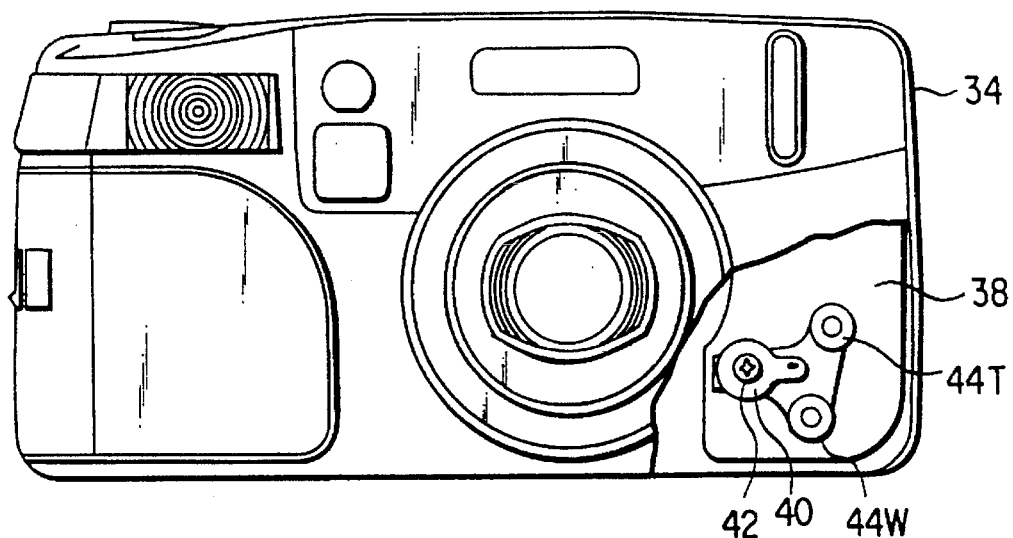
F I G. 4B

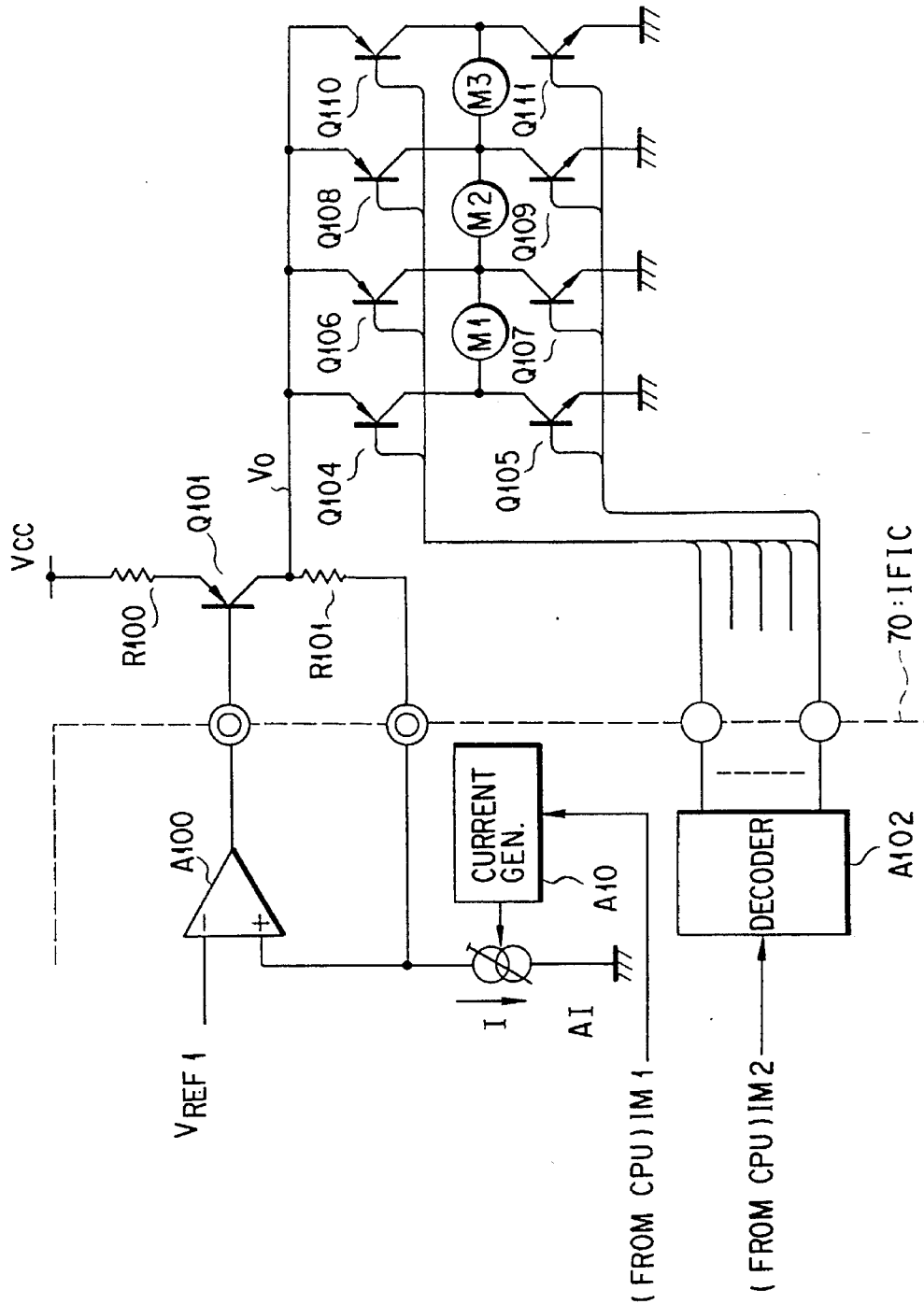
F I G. 11

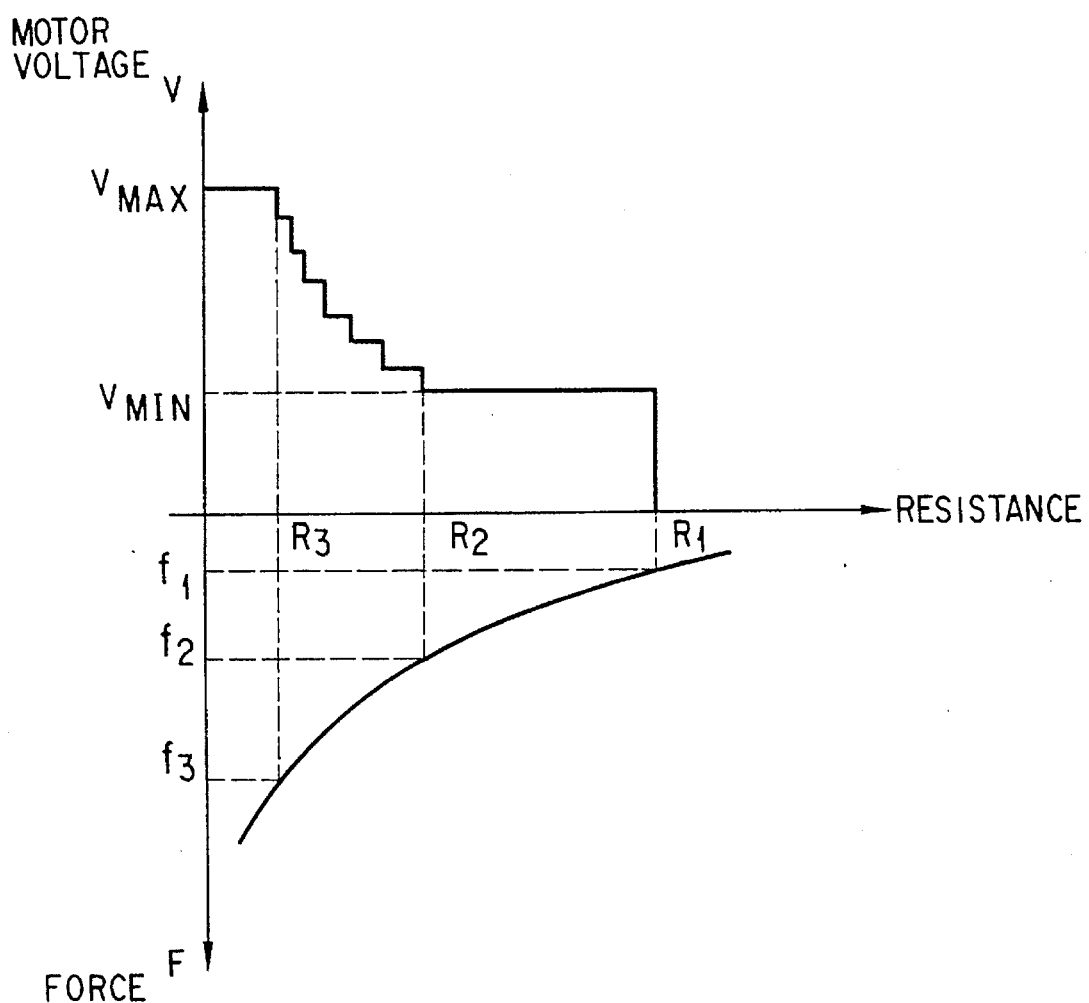
F I G. 13

LENS DRIVING DEVICE

This application is a continuation of application Ser. No. 08/001,267, filed Jan. 7, 1993, now abandoned.

BACKGROUND OF THE INVENTION

1. Field of the Invention

The present invention relates to a lens driving device, and more particularly to a lens driving device for focusing and zooming the lens of a still camera, a video camera or the like by means of a motor.

2. Description of the Related Art

A conventional motorized lens driving device uses a plurality of on/off switches in combination as operating members. The lens is driven at one or two setting speeds, three at the most. In order to increase the number of the lens driving setting speeds, it is required to increase the number of on/off switches. Increasing the number of the switches is unsuitable for equipment, such as a camera, because space is limited.

In addition, there is a device for controlling the driving speed in accordance with the amount of operation or speed of operation of a rotating member. Moreover, there is a device for controlling the driving speed in accordance with the amount of operation of a sliding contact that slides on a resistance body. However, these devices require large space and are thus unsuitable for cameras.

Therefore, various types of devices have been proposed recently which use a pressure sensitive resistance element and control the driving speed in accordance with pressure (pressing force) applied thereto (refer to Japanese Unexamined Patent Publications Nos. 47-37733, 55-133021, 61-144801, 62-112111, and 62-155791). These devices permit stepless control of the driving speed with only space for the conventional switches.

However, the conventional devices using a pressure sensitive resistance element do not match the user's operative sense because a one-to-one correspondence exists between driving speed and pressure. That is, the pressure versus resistance characteristics of the pressure sensitive resistance element is such that a change in resistance is great in the initial stage of application of pressure, and the greater the pressure becomes, the smaller the change in resistance becomes. In the case of fine adjustment, on the other hand, the operator will perform careful operation while lightening pressure. In this case, it is desired that the rate of change in driving speed with respect to change of pressure be low.

That is, with the conventional driving devices, the rate of change in driving speed with respect to change of pressure will become great when pressure is low, in other words, when the operator makes fine adjustment, failing to give camera users a good operative sense.

SUMMARY OF THE INVENTION

It is accordingly an object of the present invention to provide a lens driving device which permits the lens driving speed to be controlled without giving camera users an uneasy sense in operating a camera.

According to a first aspect of the present invention there is provided a camera zoom lens driving device comprising:

a moving unit for changing the focal length of a zoom lens;

driving means for driving said moving unit;

an operating member for specifying a direction in which said moving unit is to be driven;

pressing force detecting means responsive to an operation of pressing said operating member for producing a variable output;

storage means for storing a first predetermined value corresponding to a first pressing force to said operating member and a second predetermined value corresponding to a second pressing force larger than said first force;

drive control means for comparing an output of said pressing force detecting means with stored values in said storage means, applying no drive control signal to said driving means when the output of said pressing force detecting means is less than said first predetermined value, applying to said driving means a drive control signal for driving said lens at a constant speed irrespective of pressing force when the output of said pressing force detecting means is in the range from said first predetermined value to said second predetermined value, and outputting a drive control signal for driving said lens at a speed corresponding to the output of said pressing force detecting means when said second predetermined value is exceeded by the output of said pressing force detecting means.

According to a second aspect of the present invention there is provided a photo-taking lens driving device comprising:

a photo-taking lens;

driving means for driving said photo-taking lens;

an operating member for specifying a direction in which said photo-taking lens is to be driven;

detecting means responsive to an operation of pressing said operating member for producing a variable output; and drive control means for outputting a drive control signal corresponding to an output of said detecting means to said driving means, said drive control means outputting a drive control signal in such a way as to change the rate of change of driving speed of said driving means relative to an output of said detecting means with pressing force applied to said operating member, thereby performing drive control to fit user's operative sense.

According to a third aspect of the present invention there is provided a lens driving device comprising a photo-taking lens, an actuator for driving said photo-taking lens, an operating member for specifying a direction in which said photo-taking lens is to be driven, pressing force detecting means for detecting pressing force applied to said operating member to produce a corresponding output, and drive control means responsive to said pressing force detecting means for outputting a drive signal to said actuator, said drive control means comprising:

first comparator means for comparing an output of said pressing force detecting means with a first predetermined value, said first comparator means producing a first output when said first predetermined value is exceeded by the output of said detecting means;

second comparator means for comparing an output of said pressing force detecting means with a second predetermined value, said second comparator means producing a second output when said second predetermined value is exceeded by the output of said detecting means; and drive signal outputting means responsive to said first and second comparator means for outputting no drive signal to said actuator until said first output is produced from said first comparator means and outputting a drive signal for driving said actuator at a predetermined speed irrespective to outputs of said pressing force detecting means from when said first output is produced from said first comparator means until said second output is produced from said second comparator means.

According to a fourth aspect of the present invention there is provided a camera lens driving device comprising:

a zoom lens with a variable focal length;

a motor for driving said zoom lens;

an operating switch for instructing said motor to drive said zoom lens toward long or short focal length side;

a pressure sensitive element responsive to pressing force by an operator to said operating member for producing a variable output;

comparator means for comparing an output of said pressure sensitive element with first and second predetermined values; and motor drive control means responsive to said comparator means for driving said motor with a first predetermined voltage when the output of said pressure sensitive element is less than said first predetermined value, driving said motor with a voltage corresponding to the output of said pressure sensitive element when the output of said pressure sensitive element is greater than said first predetermined value but less than said second predetermined value, and driving said motor with a second predetermined voltage when the output of said pressure sensitive element is greater than said second predetermined value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of Mhe invention.

FIG. 2 illustrates an example of a typical pressure versus resistance characteristic;

FIGS. 3A, 3B and 3C illustrate a pressure sensitive zoom switch, more specifically, FIG. 3A is the top view thereof, FIG. 3B is a sectional side view thereof, and FIG. 3C illustrates an FPC pattern;

FIG. 4A is the front view of a camera into which the zoom switch of FIG. 3 is incorporated;

FIG. 4B is a view similar to FIG. 4A with a portion broken away;

FIG. 11 is a schematic diagram of an example of a motor drive circuit;

FIG. 13 illustrates another example of a relationship among motor voltage, pressure applied to rubber, and pressure sensitive element resistance.

DETAILED DESCRIPTION OF THE PREFERRED EMBODIMENTS

Figure 1:
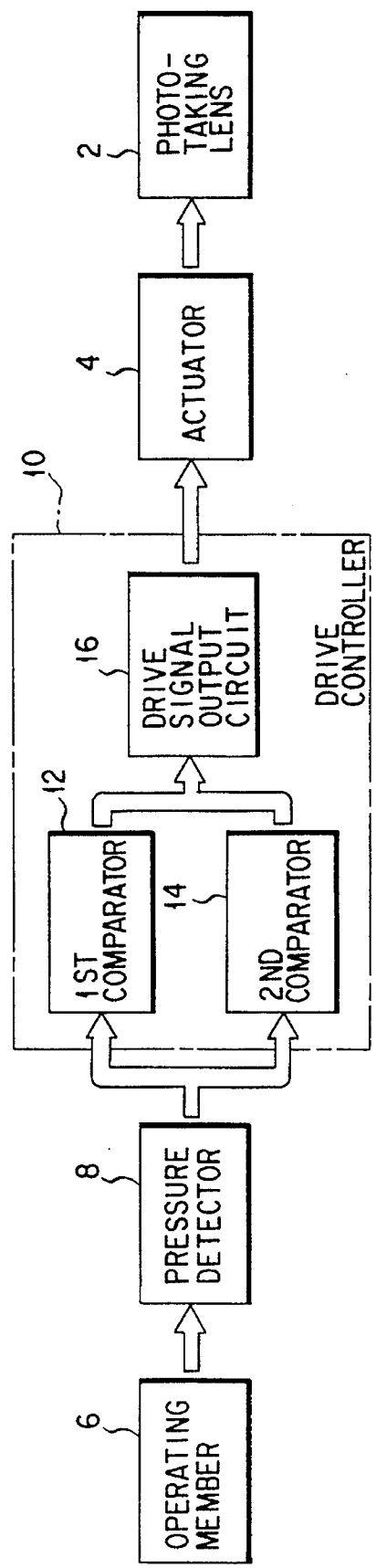
FIG. 1 is a basic block diagram of a lens driving device according to the present invention.

Referring now to FIG. 1, a lens driving device according to the present invention comprises a photo-taking lens 2, an actuator 4 for driving the lens 2, an operating member 6 for specifying a direction in which the lens is driven, a pressure detector 8 whose output varies with pressure (pressing force) applied to the operating member 6, and a drive controller 10 responsive to the output of the pressure detector 8 for outputting a drive signal to the actuator 4. The drive controller is composed of a first comparator 12, a second comparator 14, and a drive signal output circuit 16.

The first comparator 12 makes a comparison between a first predetermined value and the output of the pressure detector 8, which increases with increasing pressure applied to the operating member 6, and outputs a first output signal to the drive signal output circuit 16 when the first predetermined value is exceeded by the pressure detector output. Likewise, the second comparator 14 outputs a second output signal to the drive signal output circuit 16 when a second predetermined value larger than the first predetermined value is exceeded by the output of the pressure detector 8. The drive signal output circuit 16 is arranged in such a way as to apply no drive signal to the actuator 4 until the first output signal is output from the first comparator 12 and to output a drive signal, which drives the actuator 4 at a constant speed regardless of the output of the pressure detector 8, from when the first output signal is output until the second output signal is output.

In the lens driving device arranged as described above, when an operator (camera user) presses the operating member 6, pressure applied to the member is detected by the pressure detector 8. When the pressure applied to the operating member is increased the output of the pressure detector 8 is compared with the first and second predetermined values in the first and second comparators 12 and 14.

If the output of the pressure detector 8 is in the range for fine adjustment, that is, in the range from the first predetermined value to the second predetermined value, the drive signal output circuit 16 will output such a drive signal as drives the actuator 4 at a low constant speed. Thereby, the lens 2 will be driven at the constant speed. When the pressure is further increased to exceed the second predetermined value, the drive controller 10 controls the actuator 4 so as to change the drive speed of the lens 2 according to the pressure being applied to the operating member 6 by the operator.

The operating member and the pressure detector used in the lens driving device of the present invention will be described below.

As a pressure sensitive element used for the present invention there is a pressure sensing element which comprises a mixture of a silicon insulating resin and conductive particles. According to the element, conductivity (resistance) varies with pressure. FIG. 2 illustrates a typical pressure versus resistance characteristic of such an element. As can be seen, the resistance varies logarithmically with pressure. In order to use such a pressure sensitive element for zooming, therefore, it is necessary to perform a zoom control operation to fit its characteristic.

FIGS. 3A, 3B and 3C illustrate the operating member and a pressure sensitive zoom switch serving as the pressure detector. More specifically, FIG. 3A is the top view, FIG. 3B is a side sectional view, and FIG. 3C illustrates an FPC pattern comprising a polyimide film, lower electrodes and a cover sheet.

As shown in FIGS. 3A, 3B and 3C, lower electrodes $20_1$ and $20_2$ in the shape indicated and a reinforcing pattern 22 are formed on a polyimide film 18, and a cover sheet 24 is formed on the lower electrode $20_1$. An upper electrode sheet 28 is disposed by an adhesive tape 26 over the lower electrodes $20_1$ and $20_2$ and the reinforcing pattern 22. On the bottom surface of the upper electrode sheet 28 is disposed an upper electrode 30 covered with a pressure sensitive layer 32 to be opposed to the lower electrode $20_2$.

FIGS. 4A and 4B illustrate a camera body into which such a zoom switch is built. Zoom switches with rubber buttons 36T and 36W are disposed on the front of the camera body 34. Referring to FIG. 4B, there are shown zoom switch pressure sensitive portions 44T and 44W which are attached to the main board 38 within the camera body 34 by means of a rotation stopper 40 and a vis 42. These pressure sensitive portions 44T and 44W each correspond to the zoom switch pressure sensitive portion shown in FIG. 3.

Figure 4C:
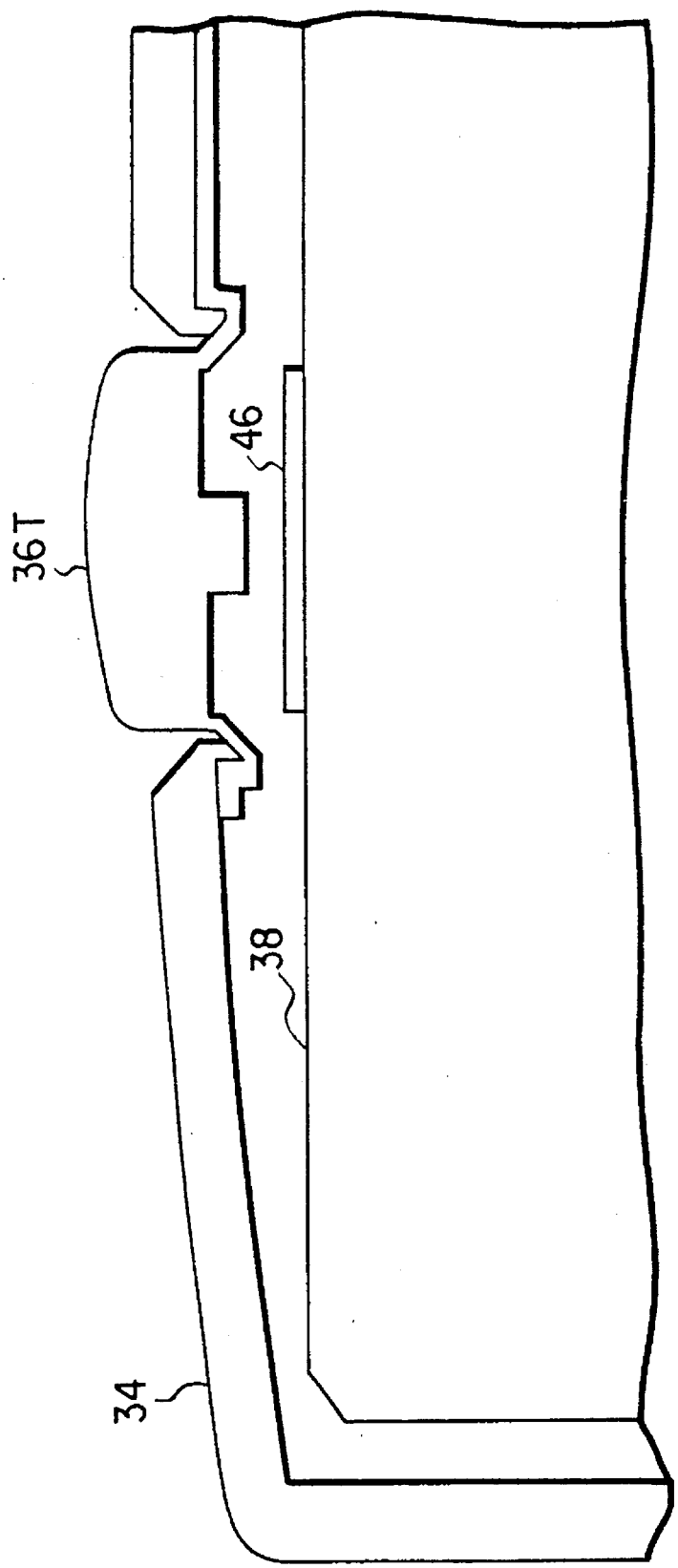
FIG. 4C is a sectional view of the pressure sensitive zoom switch of FIG. 4A.

FIG. 4C is a sectional view of the zoom switch shown in FIG. 4A. As shown in FIG. 4C, the rubber button 36T is located over the zoom switch pressure sensitive portion 46 mounted on the main board 38. Such is also the case with the rubber button 36W.

Figure 5:
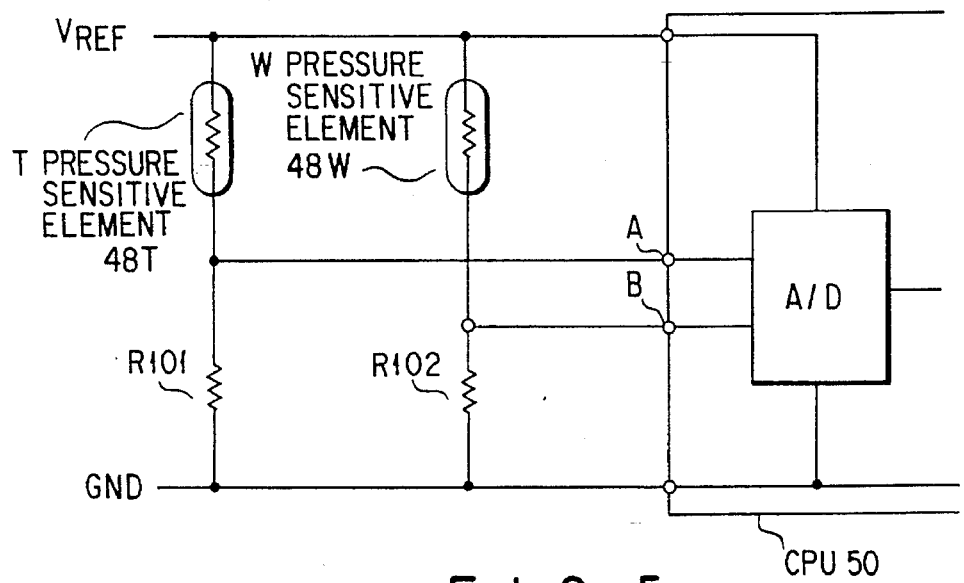
FIG. 5 is a circuit diagram of a pressure detector for detecting the output of a pressure sensitive element.

FIG. 5 illustrates a circuit for detecting the output of the pressure sensitive element in the pressure detector. The pressure sensitive elements 48T and 48W corresponding to the rubber buttons 36T and 36W in FIG. 4A have their ends connected to reference resistors R101 and R102 and their other ends connected to a reference voltage $V_{ref}$ from an interface IC not shown. The junctions of the pressure sensitive elements 48T and 48W and the reference resistors R101 and R102 are connected to a CPU (central processor unit) 50.

The potential at a point A is represented by $$V_A = V_{ref} \times (R101/(R101+R48T)) \quad (1)$$

This potential is converted to a digital value by an analog-to-digital converter in the CPU 50.

Next, the drive controller will be described.

If $V_A$ is converted to 8-bit digital data, output data of the analog-to-digital converter will be in the range from $00_H$ to $FF_H$.

Here, description is made of control of zooming speed with motor voltage. There are great individual differences as to how the zooming speed of the lens should be changed when the zoom switch is pressed. If, however, the following two points are satisfied, then an agreeable sense of zooming operation will be obtained.

That is, the first point is to move the lens as slowly as possible for fine adjustment of zooming. The second is to move the lens quickly to a desired zooming point. Further, since the characteristic of the pressure sensitive element is logarithmic, if the lens is moved slowly when pressure is low, i.e., when a change in resistance is great and quickly when pressure is great, the sense of zooming operation will be improved further.

Figure 6:
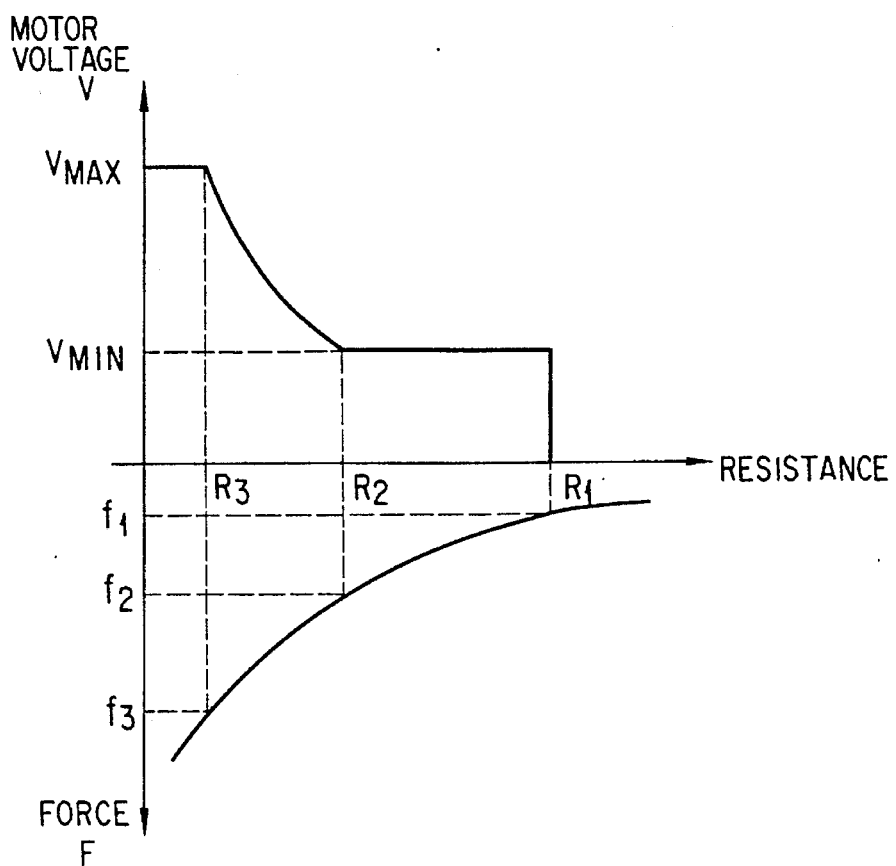
FIG. 6 illustrates a relationship among motor voltage, pressure applied to rubber, and pressure sensitive element resistance.

This will be described with reference to FIG. 6 illustrating a relationship among the motor voltage, the force applied to the rubber button and the resistance of the pressure sensitive element. Assume now that the output of the pressure sensitive element is $R_1$ and the digital value is $TH_1$ when the rubber button is pressed with a force of $f_1$, the output of the pressure sensitive element is $R_2$ and the digital value is $TH_2$ when the rubber button is pressed with a force of $f_2$, and the output of the pressure sensitive element is $R_3$ and the digital value is $TH_3$ when the rubber button pressed is with a force of $f_3$.

Here, $f_1$ is set to be a force with which zooming operation will not be performed even when the rubber button serving as the zoom switch is touched carelessly. When $f_1$ is exceeded, zooming starts. In this case, zooming is performed slowly so that fine adjustment can be made. When $f_2$ is exceeded as the result of pressing the rubber button more strongly, the CPU 50 raises the motor voltage gradually. The maximum motor voltage $V_{MAX}$ is obtained when $f_3$ is reached.

The motor voltage can be set as follows.
In the range $f_1$ to $f_2$, $$V_{MIN} = 1.2\ V + ZMBUF \times 0.3 \quad (2)$$

In the range $f_2$ to $f_3$, $$V = V_{MIN} + ((\text{digital value}) - TH2)^2 33\ ZMVK \times 0.019\ V \quad (3)$$

where $V \leq V_{MAX}$.

ZMBUF and ZMVK are values for adjustment which are stored in an EEPROM to be described later. Further, ZMBUF is set such that ZMBUF=ZMVS+a. When the camera lens will not operate because of low temperatures even if the zoom switch is pressed, automatic addition of a permits the motor voltage to be raised to a voltage at which the zoom lens can start to operate. ZMVS may be stored in the EEPROM. In view of manufacturing variations in the pressure sensitive element, the threshold values TH1 and TH2 for detecting $f_1$ and $f_2$ or the value TH2-TH1 may also be stored in the EEPROM.

In that way the drive controller operates.

Next, an application of the lens driving device to zooming operation in a camera with a built-in zoom lens will be described.

Figure 7:
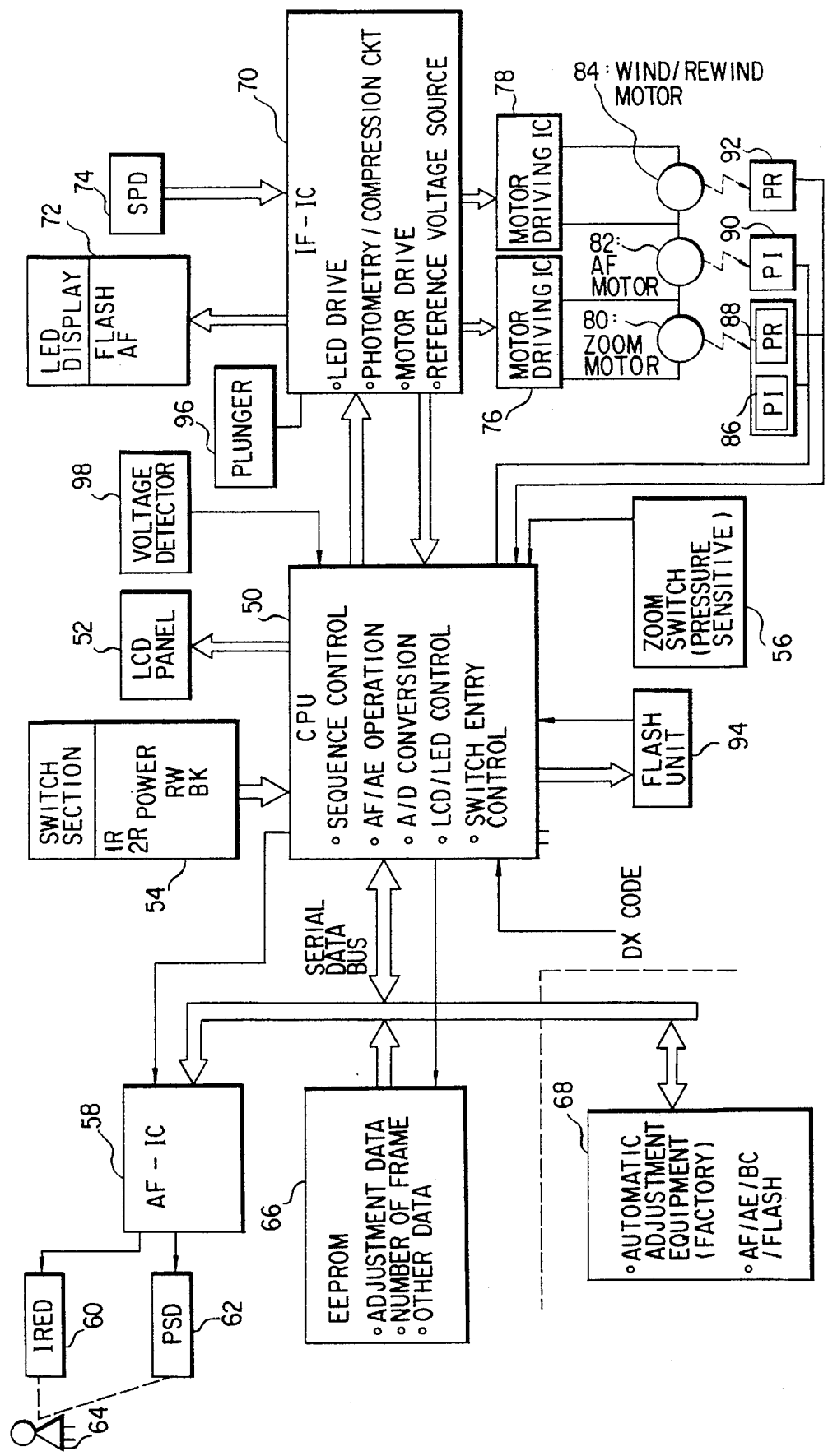
FIG. 7 is a block diagram of a camera with a built-in zoom lens in which the lens driving device of the present invention is used to drive the zoom lens.

FIG. 7 is a block diagram of a zoom camera. In this figure, a CPU 50 comprises a microcomputer which controls the entire operation of the camera. More specifically, the CPU performs sequence control of the camera operation, AF/AE operations, A/D conversion, LCD/LED control and switch entry control. An LCD panel 52 is a liquid crystal display panel which visually displays the film frame number, battery condition, etc.

Reference numeral 54 denotes a switch section in which 1R (first release) is an AF/AE lock switch which is placed in the make position when the release button is half depressed, and 2R (second release) is a shutter release switch which is placed in the make position when the release button is fully depressed. POWER is a power-on switch which, when on, allows the LCD panel to display data and places the entire camera in the ready state for shooting. RW is a forced film rewinding switch which, when on, allows midroll rewinding. BK is a switch associated with the camera back which, when the back is closed, advances the take-up portion of film. Reference numeral 56 denotes the zoom switch (pressure sensitive element).

A light emitting diode (IRED) 60 and a position sensor (PSD) 62 are coupled to the CPU 50 through an AFIC 58 adapted to measure the distance to a subject to be shot. Responsive to a control signal from the CPU 50, the AFIC 58 causes the IRED 60 to emit an infrared beam to a subject 64 and detects reflected light from the subject through the PSD 62, thereby measuring the distance to the subject. The distance data thus obtained is transferred to the CPU 50 over a serial data bus.

The EEPROM 66 is an electrically erasable ROM which stores various adjustment values such as the number of frames of film, exposure correction values, flash condition information, battery condition information, etc. To the CPU 50 is also coupled via the serial data bus automatic adjustment equipment 68 in making various adjustments in factory, which is used as a checker for checking AF (autofocus), AE (autoexposure), battery, flash, etc. Data are transferred to the CPU 50 over the serial data bus, so that the adjustment values are stored in the EEPROM 66. The DX code of film is directly read into the CPU 50 for use as a value for determining an exposure value.

An IFIC 70 is coupled to the CPU 50 by a serial data bus. The IFIC includes an LED drive circuit for driving an LED display 72 within the viewfinder, a circuit for performing photometry with photocurrent from an SPD 74 serving as a light emitting element, a motor drive circuit for driving motor drive ICs 76 and 78, a reference voltage circuit, and so on.

The motor drive ICs 76 and 78 are supplied with motor drive signals from the CPU 50 after they have been decoded in the IFIC 70. One of a zooming motor 80, an autofocusing motor 82 and a film winding/rewinding motor 84 is selectively driven by a signal from the CPU 50.

The zooming motor 80 is controlled by the CPU 50 on the basis of a signal from a zoom encoder comprised of a photo interrupter (hereinafter abbreviated to PI) 86 and a photo reflector (hereinafter abbreviated to PR) 88. The AF motor 82 is coupled with a PI 90, and the film advancing/rewinding motor 84 is coupled with a PR 92. The CPU 50 controls these motors while monitoring signals from the PI 90 and PR 92.

Reference numeral 94 denotes a built-in flash unit, and 96 denotes a plunger for opening or closing a sector. A voltage detector 98, which detects battery voltage, resets the CPU 50 when a battery is loaded or at the time of return of voltage.

Hereinafter, reference will be made to FIGS. 8 through 9 to describe the operation of the arrangement of FIG. 7.

Figure 8:
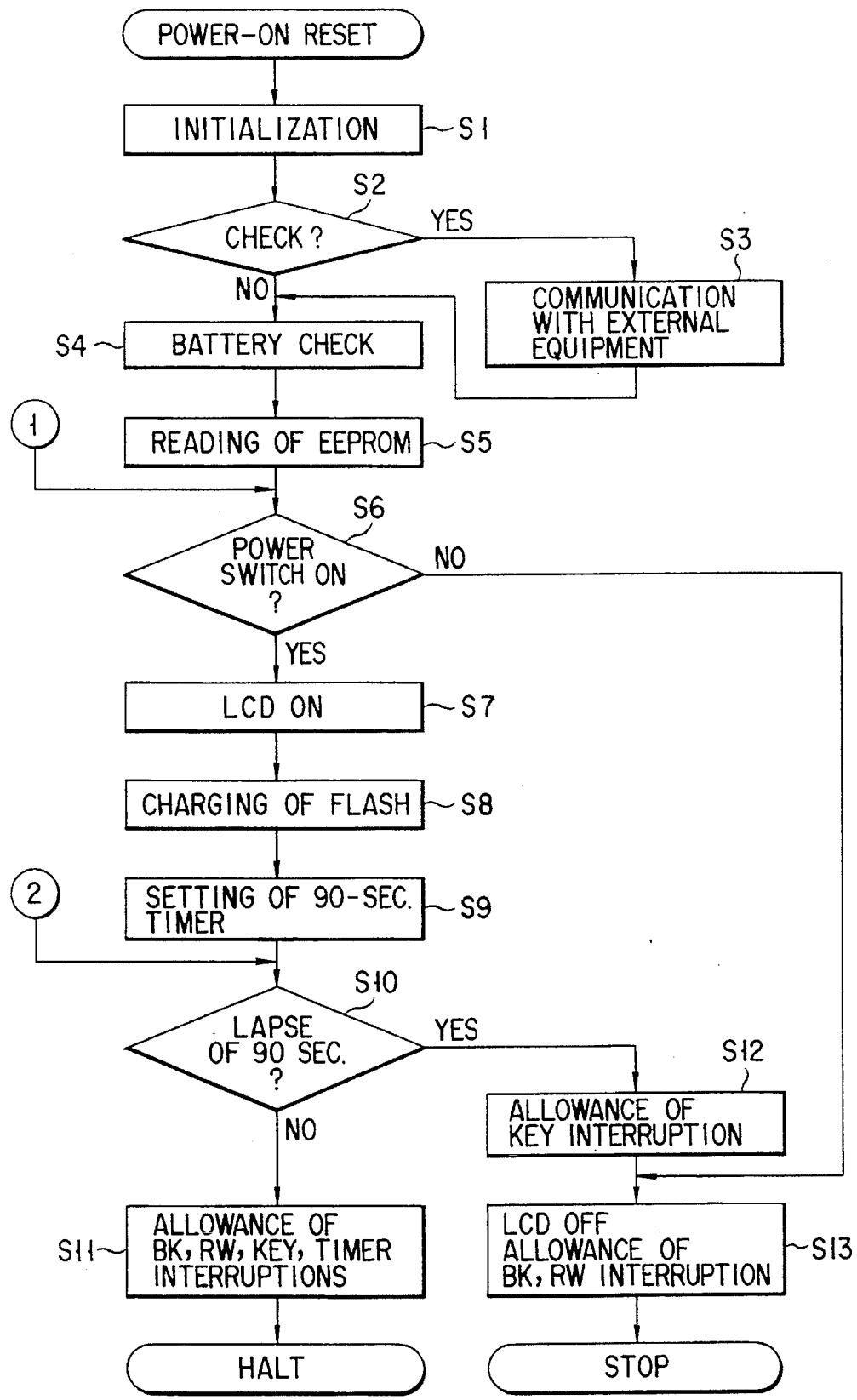
FIG. 8 is a flowchart for the power-on reset subroutine illustrating the operation of the camera of FIG. 7.

FIG. 8 is a flowchart for a power-on reset subroutine that is executed when power is applied to the zoom lens camera. When a battery is loaded or the power switch is turned on, the CPU 50 is reset, so that the camera is brought into operation. When the power-on reset subroutine is called, each port and a RAM are first initialized in step S1, and a check is then made in step S2. If, as a result of the check, the automatic adjustment equipment is coupled to the CPU 50, communication is performed with the external equipment in step S3. Subsequently, battery check is made in step S4. If the automatic adjustment equipment is coupled to the CPU 50 in step S3, the battery check is made immediately in step S4. If, at this point, the battery voltage is insufficient, "no battery voltage" is displayed on the LCD panel 52 and all the camera operations are disabled. In subsequent step S5, data are read from the EEROM 66 into the CPU 50.

In step S6, the power switch is checked. If the power switch in the switch operating section 54 is off, the operation advances to step S13. If the power switch is on in step S6, on the other hand, the LCD panel is enabled and then the flash unit 94 is charged in step S8 so that a photo can be taken at any time.

Subsequently, a 90-second timer is set in step S9, so that an LCD display period of time of 90 seconds is set. If the user operates any switch, then the 90-second timer will be set again. In subsequent step S10, a decision is made as to whether or not 90 seconds has elapsed. If YES, the operation advances to step S12. If NOT, on the other hand, the operation advances to step S11.

In step S11, interruptions caused by the camera back switch BK, the film rewinding switch RW and some other operating switch (hereinafter abbreviated to KEY) are allowed, and then the CPU is placed in the halt state.

If YES in step S10, an interruption caused by the KEY is allowed in step S12. In subsequent step S13, the LCD display is turned off and interruptions caused by the camera back switch BK and the film forced rewinding switch RW are allowed. Subsequently the CPU is placed in the stopped state.

Figure 9A:
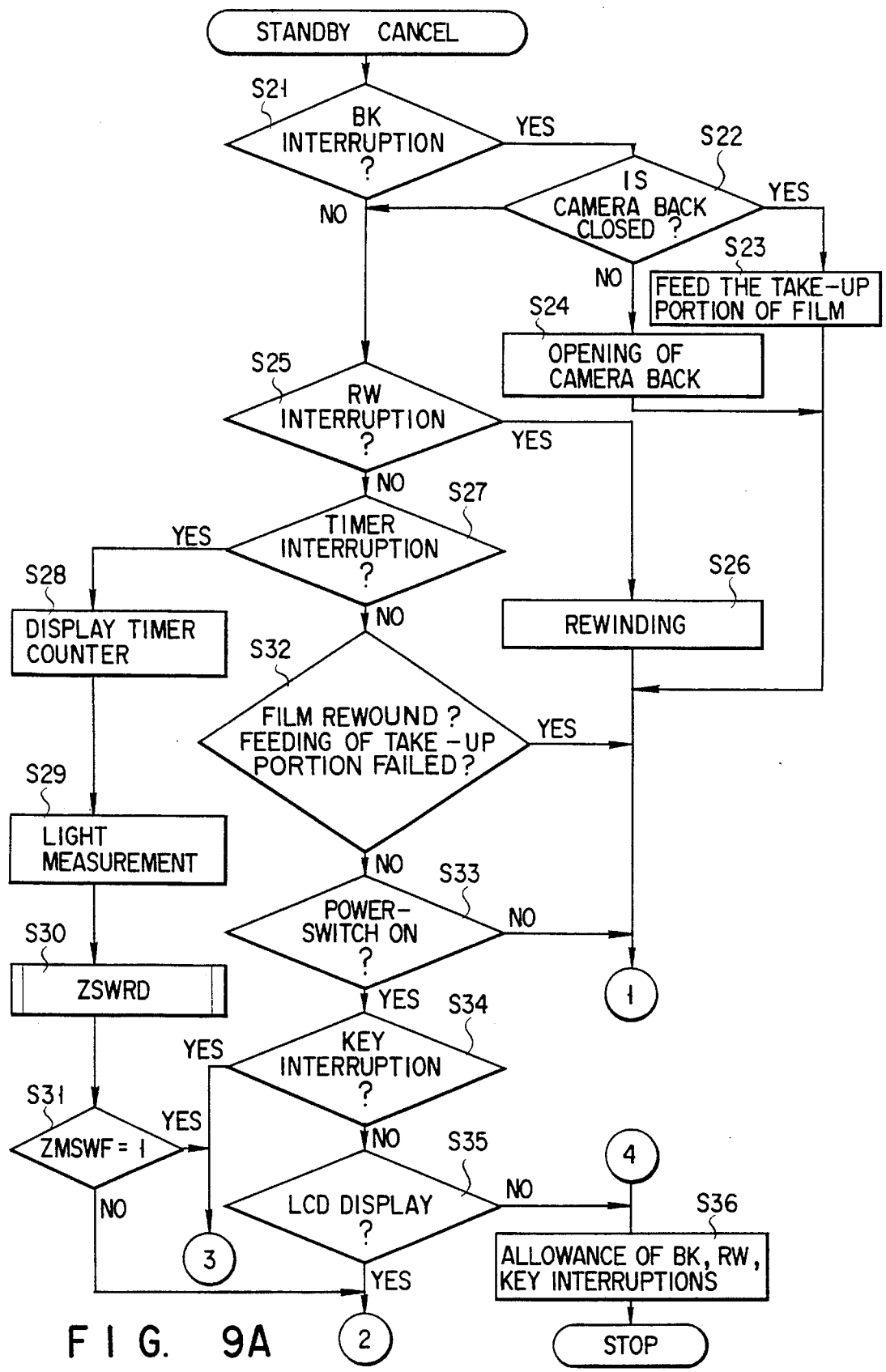
FIGS. 9A and 9B are a flowchart for the standby canceling subroutine of the camera of FIG. 7.
Figure 9B:
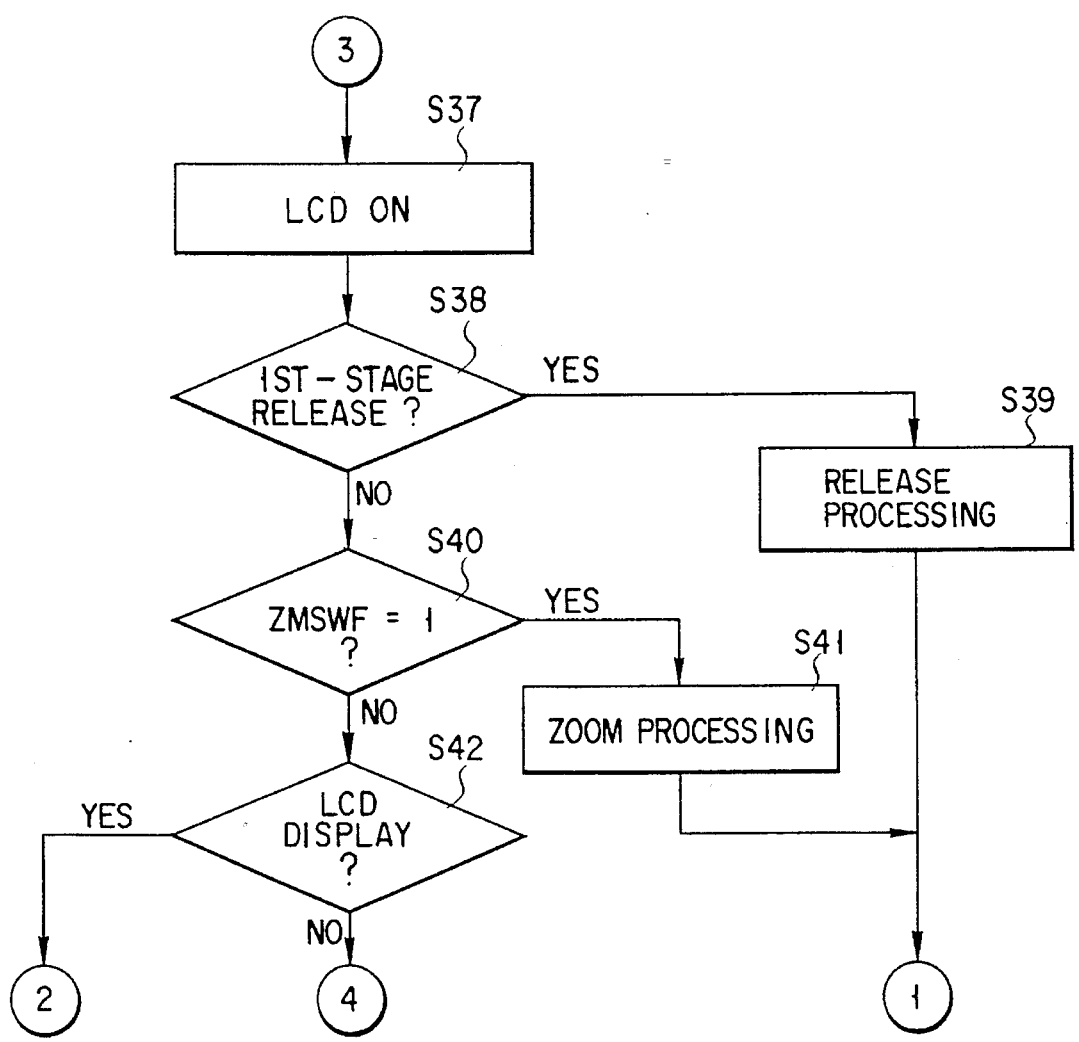

When an interruption-allowed switch is pressed in the stopped state or the halt state, a standby-canceling subroutine shown in FIGS. 9A and 9B is executed.

FIGS. 9A and 9B are a flowchart for the standby-canceling subroutine. When the standby-canceling subroutine is called, a check is first made for the presence of an interruption by the camera back switch BK in step S21. In the presence of an interruption by the camera back switch BK, a decision is made in step S22 as to whether the camera back is closed. If YES in step S22, the process of advancing the take-up portion of film is executed in step S23. The operation subsequent returns to step S6 in FIG. 8. If NO in step S22, on the other hand, the process of opening the camera back is executed in step S24 and then return is made to step S6 in FIG. 8.

In the absence of the BK interruption in step S21, a check is made for the presence of an interruption caused by the film rewinding switch RW in step S25. If YES in step S25, a film rewinding operation is performed in step S26 and then return is made to step S6.

In the absence of the RW interruption in step S25, a check is made for the presence of a timer interruption in step S27. If YES, then a display time count operation is performed in step S28. Light measurement is made in step S29, and the zoom switch is detected in step S30. Subsequently, a check is made in step S31 as to whether ZMSWF=1. If YES, the operation advances to step S37. If NO, the operation returns to step S10 in FIG. 8. That is, light measurement is made continuously throughout display.

In the absence of the timer interruption in step S27, a check is made as to whether the film rewinding has terminated or the take-up portion of film advance has failed. If YES, the operation returns to step S6 so that the camera will not operate. If NO in step S32, on the other hand, the operation advances to step S33.

In step S33, the power switch state is checked. If the power switch is off, the operation returns to step S6. If the power switch is on, on the other hand, the operation advances to step S34, so that the main flow is continued as it is.

In step S34, a check is made for the presence of a KEY interruption. That is, if some mode key is pressed to generate an interruption, steps S37 through S42 to be described later will be executed. In the absence of any interruption, the operation advances to step S35 in which a check is made as to whether or not the LCD is in the display state. If, at this point, the LCD is not in the display state, the operation advances to step S36 in which BK, RW and KEY interruptions are allowed. Subsequently the CPU enters the stopped state. If, on the other hand, the LCD is in the display state in step S35, the operation returns to step S10 described above.

Note here that the KEY in steps S10, S34 and S36 indicates any one of switches such as 1R and 2R in the switch section 6 in FIG. 1.

Next, description will be made of the flowchart when a KEY interruption is generated.

In the presence of any KEY interruption in step S34, the LCD is turned on in step S37. In subsequent step S38, a check is made as to whether or not the first-stage release (first release) switch has been pressed. If YES, release processing is performed in step S39 and the operation then returns to step S6 in FIG. 8.

If, in step S38, the first-stage release switch is off, the operation advances to step S40 in which a check is made as to whether or not the zoom switch flag ZMSWF has been set to 1. If ZMSWF=1, a zooming operation is performed in step S41. The zooming operation will be described later. If ZMSWF=0, on the other hand, a check is made in step S42 as to whether or not the LCD is in the display state. Subsequently the operation returns to either step S10 in FIG. 8 or step S36 in FIG. 9A.

Figure 10:
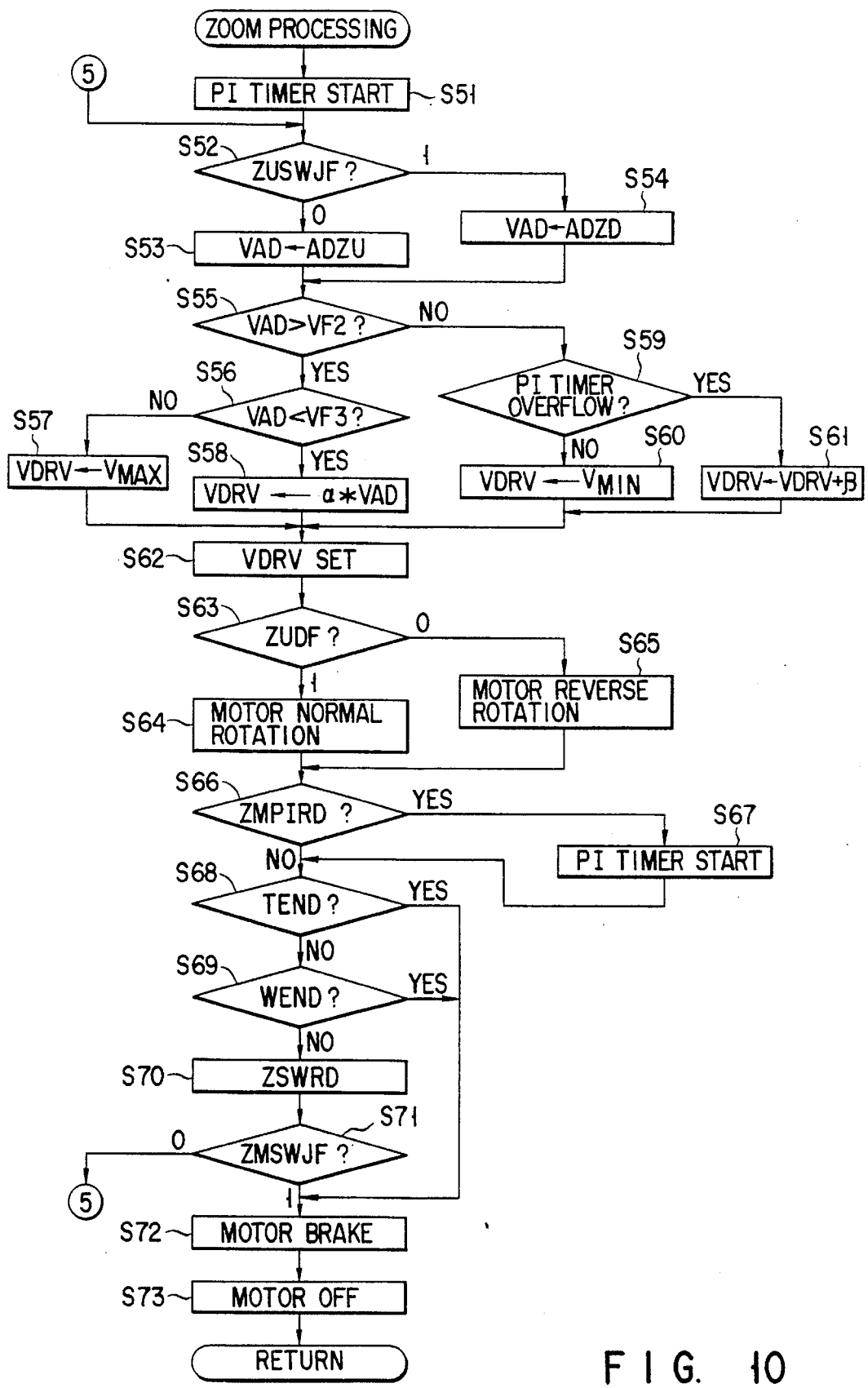
FIG. 10 is a flowchart for the zooming subroutine indicated by step S41 in FIG. 9B.

FIG. 10 illustrates a subroutine for the zooming process in step S41 in FIG. 9B.

First, a zooming PI timer is started in step S51. This timer is restarted for each entry of a PI edge. In subsequent step S52, a check is made as to whether the SW detected by zoom switch reading ZSWRD is zoom-up switch or zoom-down switch.

If the zoom-up switch is on (ZUSWJF=0) in step S52, an ADZU value is entered into an A/D conversion register VAD in step S53. If, on the other hand, ZUSWJF=1, an ADZD value is entered into the VAD in step S54.

Next, in steps S55 and S56, the VAD value is compared with VF2 and VF3, which are voltage values corresponding to $f_2$–R2 and $f_3$–R3 shown in FIG. 6.

If, as the result of comparison in steps S55 and S56, the VAD ranges between VF2 and VF3 (between $f_2$ and $f_3$ in FIG. 6), a*VAD is set to VDRV in step S58. a may be a predetermined value or a value corresponding to VAD. If, on the other hand, the VAD is greater than the VF3 in step S56, $V_{MAX}$ is set to VDRV in step S57.

If, in step S55, the VAD is less than VF2 (between $f_1$ and $f_2$ in FIG. 6), a check is made in step S59 as to whether or not an overflow has occurred in the PI timer. If NOT, the VDRV is set to Vmin. If, on the other hand, an overflow has occurred, that is, if the PI 86 for the zooming motor 80 has produced no output for a predetermined period of time, β, a predetermined value, is added to the motor drive voltage VDRV in step S61. In this step, although the zoom motor 80 is being supplied with a drive signal, the motor drive voltage is raised in case where the PI 86 produces no output for a predetermined period of time.

Next, in step S62, VDRV is set as the drive voltage of the motor drive circuit. In subsequent step S63, a check is made for the direction of zooming (zoom-up or zoom-down). As a result, a normal rotation signal is applied to the motor drive circuit in step S64, or a reverse rotation signal is applied in step S65.

The motor drive circuit can be constructed as shown in FIG. 11.

A voltage setting operational amplifier A100 in the IFIC 70 has its inverting input connected to a reference voltage and its noninverting input connected to a constant current source AI. The output of the amplifier A100 is connected to a motor current limiting resistor R100 and a motor voltage setting resistor R101 through a voltage control transistor Q101.

Between the transistor Q101 and the resistor R101 are connected PNP transistors Q104, Q106, Q108 and Q110, NPN transistors Q105, Q107, Q109 and Q111, and zooming, autofocusing and film winding/rewinding motors M1, M2 and M3. Either motor M1, M2 or M3 is selectively driven by outputs of a decoder A102 for decoding a control signal IM2 from the CPU. Each motor can be rotated in either direction by selectively driving its associated drive transistors by means of decoder outputs.

Reference character A10 denotes a current generating circuit which is responsive to a control signal IM1 from the CPU to cause the constant current source AI to generate a constant current I.

The motor voltage setting in the motor drive circuit is performed as follows.

Suppose now that the motor voltage is $V_o$. Responsive to application of a control signal IM1 from the CPU, the current generating circuit A10 generates a corresponding current which will flow through the resistor R101, producing a voltage drop. The operational amplifier A100 is supplied with the reference voltage vref1. Thus, a voltage $V_0$=VREF1+(R101× IM1) is output from the transistor Q101. Since IM1 can be varied by the CPU, $V_0$ can be obtained at any voltage.

Returning now to the flowchart of FIG. 10, a zoom PI edge detecting subroutine is executed in step S66. In the presence of a change in the PI edge, the PI timer is restarted in step S67. The detection of the zoom PI edge is well known and thus its description is omitted herein.

Next, in step S68 or step S69, a check is made for telescopic end or wide end. This check is made by counting pulses from the PI 86 in FIG. 7 to detect the telescopic end or wide end position. In the case of the telescopic end or wide end, a brake signal and an off signal are applied to the motor drive circuit in steps S72 and S73. The operation then leaves the present routine.

If the tele end or the wide end has not been reached in steps S68 and S69, a ZSWRD subroutine is called in step S70 to detect the zoom switch state. If, in subsequent step S71, both of the zoom switches are not pressed (ZMSWJF= 1), then a brake signal and an off signal are output in steps S72 and S73. The operation then leaves the present routine. If, on the other hand, either of the switches has been pressed, then a jump is made to step S52 to repeat the present routine.

Figure 12:
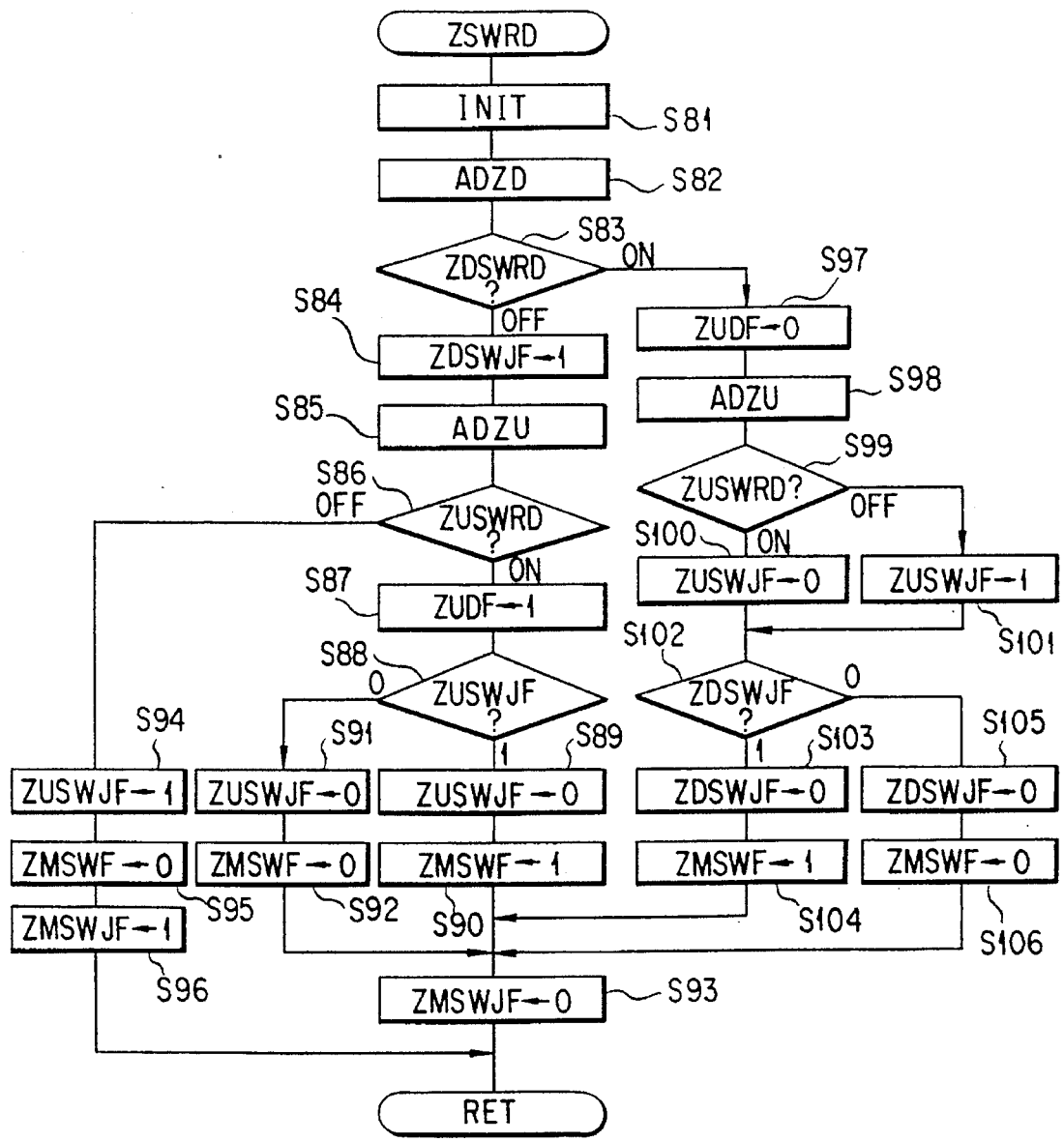
FIG. 12 is a flowchart for the reading of the zoom switch.

Hereinafter, the zoom SW reading ZSWRD will be described with reference to a flowchart shown in FIG. 12. Note that, in the following description, T is associated with zoom-up, and W is associated with zoom-down.

In step S81, INIT, i.e., processes necessary to read the zoom switches are performed. The processes include setting ports of the CPU 50, turning the IFIC 70 on to output the VREF, etc. In subsequent step S82, analog-to-digital conversion of an output of the W zoom switch is performed (ADZD).

In step S83, a check is made as to whether the analog-to-digital conversion value for the W zoom switch has exceeded a threshold value. This threshold value is stored in the EEPROM 66. It is ON when the threshold value is exceeded, otherwise OFF. If OFF in step S83, then the state flag ZDWJF is set to 1 in step S84 because the W zoom switch is in the OFF state. The state flag ZDWJF is 0 when the W zoom switch is in the ON state.

Next, in step S85, analog-to-digital conversion of an output of the T zoom switch is performed (ADZU). Subsequently, a check is made in step S86 as to whether or not the threshold value is exceeded by the resulting digital value for the T zoom switch. If the threshold value is exceeded, the zoom-up/down flag is set to 1 in step S87. When this flag is 1, zoom-up is performed.

In step S88, the last T zoom switch state is checked. If the zoom-up switch state flag ZUSWJF is 1 in step S88, then ZUSWJF and ZMSWF are set to 0 and 1, respectively, in steps S89 and S90. That is, the T zoom switch state flag ZUSWJF is set to 0. And, since the zoom switch was off at the last time and is on at this time, it is decided that a rise occurred in the output of the switch, i.e., the switch was pressed. Consequently the zoom switch flag ZMSWF is set to 1. when the switch is not pressed or continues to be pressed, the flag becomes 0.

If, on the other hand, ZUSWJF is 0 in step S88, the operation advances to steps S91 and S92, so that the process when the last T zoom switch state was OFF is performed. That is, the T zoom switch stage flag ZUSWJF is set to 0, and the zoom switch flag ZMSWF is cleared to 0 because it is decided that there is no fall of ZMSW because the last and current zoom switch states are both ON. In subsequent step S93, ZMSWJF is set to 0 because either zoom up or zoom down is ON.

If, in the above step S86, the threshold value is not exceeded by the digital value for the T zoom switch, the operation advances to steps S94, S95 and S96, so that processes for the case where the T zoom switch is OFF are performed. That is, since the T zoom switch state flag is OFF, ZUSWJF is set to 1. Since the zoom-up switch and the zoom-down switch are both OFF, ZMSWF is cleared to 0 and the zoom switch state flag is set to 1. This flag is set to 0 when either the zoom-down switch or the zoom-up switch is pressed or to 1 when both are OFF.

If, in step S83, the threshold value is not exceeded by the W digital value, then the zoom up/down flag ZUDF is set to 0 in step S97. In subsequent step S98, an output of the T zoom switch is subjected to analog-to-digital conversion (ADZU). A check is subsequently made in step S98 as to whether or not the threshold value is exceeded by the T zoom switch digital value. When exceeded, it is decided that the T zoom switch is ON. In this case, the zoom-up (T) switch state flag is set to 0 in step S100. When not exceeded, on the other hand, it is decided that the T switch is OFF. In this case, the zoom-up switch state flag is set to 1.

In subsequent step S102, the last zoom-down (W) switch state is checked. If, in step S102, the ZUSWJF is 1, the operation advances to steps S103 and S104. Since the last zoom-down switch state is OFF, the ZDSWJF is set to 0 in step S103, and then, since a rise occurred in the zoom switch output, the ZMSWF is set to 1.

If, on the other hand, the ZUSWJF is 0 in step S102, the operation advances to steps S105 and S106. That is, the zoom-down switch state flag is set to 0 in step S105, and, since it is decided that there is no rise in the switch output because the last zoom-down switch state is also ON, the ZMSWF is set to 0 in step S106. Subsequently, a return is made via step S93.

In the above embodiment, the zoom motor speed is determined by a set voltage. However, the zoom motor can be controlled by the PI 86. Thus, voltage may be set in such a way as to make the pulse duration constant, that is, in such a way as to make the zoom speed constant. This will be described briefly.

In the above embodiment, the motor voltage is set to vary in proportion to pressing force where it is in excess of $f_2$ as shown in FIG. 6. Alternatively, the motor voltage may be changed in steps as shown in FIG. 13. In this case, a change in drive output can be made small when pressing force is small, whereas it can be made large when force is great. This will improve the user's sense of operation further. This approach could be done by discriminating VAD finely in step S56 in FIG. 10.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A camera zoom lens driving device comprising:

a moving unit for changing the focal length of a zoom lens;

driving means for driving said moving unit;

an operating member for specifying a direction in which said moving unit is to be driven;

pressing force detecting means responsive to an operation of pressing said operating member for producing a variable output;

storage means for storing a first predetermined value corresponding to a first pressing force to said operating member and a second predetermined value corresponding to a second pressing force larger than said first force;

drive control means for comparing an output of said pressing force detecting means with stored values in said storage means, applying no drive control signal to said driving means when the output of said pressing force detecting means is less than said first predetermined value, applying to said driving means a drive control signal for driving said lens at a constant speed irrespective of pressing force when the output of said pressing force detecting means is in the range from said first predetermined value to said second predetermined value, and outputting a drive control signal for driving said lens at a speed corresponding to the output of said pressing force detecting means when said second predetermined value is exceeded by the output of said pressing force detecting means.

2. The lens driving device according to claim 1, in which said drive control signal is a control signal for controlling the speed of said moving unit driven by said driving means.

3. The lens driving device according to claim 1, in which said pressing force detecting means comprises a series circuit of a pressure sensitive element whose resistance value varies with pressing force applied thereto and a resistor having a predetermined resistance value and an analog-to-digital conversion circuit for converting a voltage at a point of connection between said pressure sensitive element and said resistor when a predetermined voltage is applied across said series circuit to a digital value.

4. A camera zoom lens driving device according to claim 1, wherein, when the output of said pressing force detecting means exceeds said second predetermined value, said drive control means drives a drive voltage V of said driving means in accordance with one of the following two operation expressions:

$V = \alpha \times VAD$; and $V = V_{MIN} + (\text{digital value} - TH2)^2 \times ZMVK \times C$, where a=a constant;
VAD=an A/D conversion resistor value;
$V_{MIN}$=a minimum operating voltage;
TH2=a threshold value of a predetermined pressing force;
digital value=an analog-to-digital converted value;
C=a constant; and
ZMVK=an adjustment value.

5. A camera zoom lens driving device according to claim 1, wherein said pressing force detecting means includes:
   a pressure sensitive element, which outputs an analog signal in response to a pressing force; and
   an analog-to-digital convertor which converts said analog signal to a digital signal.

6. A camera zoom lens driving device according to claim 1, wherein:
   said storage means stores a third predetermined value which is larger than the second predetermined value; and
   said drive control means compares the output of said pressing force detecting means with said third predetermined value and then applies a drive control signal for driving said lens at a second driving speed which is higher than said constant speed when the output of said pressing force detecting means is larger than said third predetermined value.

7. A camera zoom lens driving device comprising:
   a zoom lens;
   a moving unit for changing the focal length of said zoom lens;
   driving means for driving said moving unit;
   an operating member for specifying a direction in which said moving unit is to be driven;
   pressing force detecting means responsive to an operation of pressing said operating member for producing a variable output; and
   drive control means for outputting a drive control signal corresponding to an output of said pressing force detecting means to said driving means, said drive control means outputting to said driving means a drive control signal corresponding to an output of said pressing force detecting means when the output of said pressing force detecting means is in a range from a first predetermined value corresponding to a first pressing force to a second predetermined value corresponding to a second pressing force stronger than said first pressing force, and said drive control means controlling said driving means so as to cause said driving means to drive said moving unit at a constant speed regardless of a pressing force in the case where the output of said pressing force detecting means is outside the range from the first predetermined value to the second predetermined value.

8. The lens driving device according to claim 7, in which said drive control signal is a control signal for controlling the speed of said moving unit driven by said driving means.

9. The lens driving device according to claim 7, in which said pressing force detecting means comprises an analog-to-digital conversion circuit for producing a digital output corresponding to a pressing force applied to said operating member.

10. The zoom lens driving device according to claim 7, in which said drive control means divides the range from said first predetermined value to said second predetermined value into a plurality of subranges and outputs an equal drive control signal when outputs of said pressing force detecting means lie within the same subrange.

11. A photo-taking lens driving device comprising:
    a photo-taking lens;
    driving means for driving said photo-taking lens;
    an operating member for specifying a direction in which said photo-taking lens is to be driven;
    detecting means responsive to an operation of said operating member for producing a continuously variable output; and
    drive control means for outputting a drive control signal corresponding to an output of said detecting means to said driving means, said drive control means outputting to said driving means a drive control signal corresponding to an output of said detecting means when the output of said detecting means is in a range from a first predetermined value to a second predetermined value larger than said first predetermined value, and said drive control means controlling said driving means so as to cause said driving means to drive said phototaking lens at a constant speed regardless of a pressing force in the case where the output of said pressing force detecting means is outside the range from the first predetermined value to the second predetermined value.

12. The lens driving device according to claim 11, in which said detecting means comprises an analog-to-digital conversion circuit for producing a digital output in response to an operation of said operating member.

13. A photo-taking lens driving device comprising:
    a photo-taking lens;
    driving means for driving said photo-taking lens;
    an operating member for specifying a direction in which said photo-taking lens is to be driven;
    detecting means responsive to an operation of said operating member for producing a variable output; and
    drive control means for outputting a drive control signal corresponding to an output of said detecting means to said driving means, said drive control means outputting to said driving means a drive control signal for driving said lens at a predetermined speed irrespective of outputs of said detecting means when the output of said detecting means exceeds a predetermined value, and said drive control means supplying to said driving means another drive control signal, by which said driving means is driven at a speed corresponding to an output of said operating member, in the case where the output of said operating member is not greater than the predetermined value.

14. The lens driving device according to claim 13, in which said detecting means comprises an analog-to-digital conversion circuit for producing a digital output in response to an operation of said operating member.

15. A photo-taking lens driving device, comprising:
    a photo-taking lens;
    driving means for driving said photo-taking lens;
    an operating member for specifying a direction in which said photo-taking lens is to be driven;
    detecting means responsive to an operation of pressing said operating member for producing a variable output, said detecting means comprising an analog-to-digital conversion circuit for converting an output of said operating member to a digital value; and
    drive control means for outputting a drive control signal corresponding to an output of said detecting means to said driving means, wherein said drive control means outputs no drive control signal to said driving means until a predetermined value corresponding to a predetermined operating pressure applied to said operating member is reached, as determined by an output of said detecting means and wherein said drive control means applies to said driving means a drive control signal for driving said photo-taking lens at a constant speed irrespective of outputs of said detecting means when said predetermined value is exceeded by an output of said detecting means.

16. The lens driving device according to claim 15, further comprising storage means for storing said predetermined value.

17. A camera driving device comprising:
an actuator for driving a camera mechanism;
an operating member for instructing said actuator to drive said camera mechanism;
detecting means responsive to an operation of said operating member for producing a continuously variable output, said detecting means comprising an analog-to-digital conversion circuit for converting an output of said operating member to a digital value; and
drive control means for outputting to said actuator:
  a drive control signal corresponding to an output of said detecting means when the output of said detecting means is within a predetermined range,
  no drive control signal until a first predetermined value is reached by an output of said detecting means,
  a predetermined drive control signal when the output of said detecting means is outside the predetermined range, and
  a drive control signal for driving said photo-taking lens at a constant speed irrespective of outputs of said detecting means when a second predetermined value is exceeded by an output of said detecting means.

18. The lens driving device according to claim 17, in which said camera mechanism comprises a lens driving mechanism.

19. The lens driving device according to claim 18, in which said detecting means includes a pressure sensitive element whose resistance value varies with operating pressure applied to said operating member.

20. The lens driving device according to claim 18, in which said drive control means outputs no drive control signal to said actuator until a first predetermined value is reached by an output of said detecting means.

21. The lens driving device according to claim 18, in which said drive control means applies to said actuator a drive control signal for driving said photo-taking lens at a constant speed irrespective of outputs of said detecting means when a second predetermined value is exceeded by an output of said detecting means.

22. The lens driving device according to claim 18, in which said operating member is disposed on the camera front.

23. In a lens driving device comprising a photo-taking lens, an actuator for driving said photo-taking lens, an operating member for specifying a direction in which said photo-taking lens is to be driven, pressing force detecting means for detecting pressing force applied to said operating member to produce a corresponding output, and drive control means responsive to said pressing force detecting means for outputting a drive signal to said actuator,
said drive control means comprises:
first comparator means for comparing an output of said pressing force detecting means with a first predetermined value, said first comparator means producing a first output when said first predetermined value is exceeded by the output of said detecting means;
second comparator means for comparing an output of said pressing force detecting means with a second predetermined value, said second comparator means producing a second output when said second predetermined value is exceeded by the output of said detecting means; and
drive signal outputting means responsive to said first and second comparator means for outputting no drive signal to said actuator until said first output is produced from said first comparator means and outputting a drive signal for driving said actuator at a constant speed irrespective to outputs of said pressing force detecting means from when said first output is produced from said first comparator means until said second output is produced from said second comparator means.

24. The lens driving device according to claim 23, further comprising movement detecting means for detecting movement of said photo-taking lens, and in which said drive signal outputting means, when any movement of said photo-taking lens is not detected by said movement detecting means while said drive signal outputting means is outputting a drive signal for driving said actuator at a predetermined speed, outputs a drive signal for driving said actuator at a speed higher than said predetermined speed.

25. In a lens driving device comprising a photo-taking lens, a motor for driving said photo-taking lens, an operating member for specifying a direction in which said photo-taking lens is to be driven, a pressure sensitive element whose resistance value varies with pressing force applied to said operating member, analog-to-digital conversion means for converting an output of said pressure sensitive element to a digital value, and drive control means responsive to said analog-to-digital conversion means for outputting a drive voltage to said motor,
said drive control means comprises:
first comparator means for comparing an output of said analog-to-digital conversion means with a first predetermined value, said first comparator means producing a first output when said first predetermined value is exceeded by the output of said analog-to-digital conversion means;
second comparator means for comparing an output of said analog-to-digital conversion means with a second predetermined value, said second comparator means producing a second output when said second predetermined value is exceeded by the output of said analog-to-digital conversion means; and
drive voltage outputting means responsive to said first and second comparator means for outputting no drive voltage to said motor until said first output is produced from said first comparator means and driving said motor with a predetermined voltage irrespective of outputs of said pressing force detecting means from when said first output is produced from said first comparator means until said second output is produced from said second comparator means.

26. In a driving device comprising an actuator, an operating member, a motor for driving said photo-taking lens, pressing force detecting means for detecting pressing force applied to said operating member to produce a variable output, and drive control means responsive to an output of said pressing force detecting means for outputting a drive signal to said actuator, said drive control means comprises:

first comparator means for comparing an output of said pressing force detecting means with a first predetermined value, said first comparator means producing a first output when said first predetermined value is exceeded by the output of said pressing force detecting means;

second comparator means for comparing an output of said pressing force detecting means with a second predetermined value, said second comparator means producing a second output when said second predetermined value is exceeded by the output of said pressing force detecting means; and drive signal outputting means responsive to said first and second comparator means for outputting no drive signal to said actuator until said first output is produced from said first comparator means and a drive signal for driving said actuator at a predetermined speed irrespective to outputs of said pressing force detecting means from when said first output is produced from said first comparator means until said second output is produced from said second comparator means.

27. The driving device according to claim 26, further comprising a moving member which is moved by said actuator, and movement detecting means for detecting movement of said moving member, and in which said drive signal outputting means, when any movement of said moving member is not detected by said movement detecting means while said drive signal outputting means is outputting a drive signal for driving said actuator at a predetermined speed, outputs a drive signal for driving said actuator at a speed higher than said predetermined speed.

28. In a driving device comprising a motor, an operating member, a pressure sensitive element whose resistance value varies with pressing force applied to said operating member, analog-to-digital conversion means for converting an output of said pressure sensitive element to a digital value, and drive control means responsive to said analog-to-digital conversion means for outputting a drive voltage to said motor, said drive control means comprises:

first comparator means for comparing an output of said analog-to-digital conversion means with a first predetermined value, said first comparator means producing a first output when said first predetermined value is exceeded by the output of said analog-to-digital conversion means;

second comparator means for comparing an output of said analog-to-digital conversion means with a second predetermined value, said second comparator means producing a second output when said second predetermined value is exceeded by the output of said analog-to-digital conversion means; and drive voltage outputting means responsive to said first and second comparator means for outputting no drive voltage to said motor until said first output is produced from said first comparator means and driving said motor with a predetermined voltage irrespective of outputs of said analog-to-digital conversion means from when said first output is produced from said first comparator means until said second output is produced from said second comparator means.

29. A lens driving device comprising:

a photo-taking lens;

an actuator for driving said photo-taking lens;

movement detecting means for detecting movement of said photo-taking lens;

an operating member for specifying a direction in which said photo-taking lens is to be driven;

pressing force detecting means for detecting pressing force applied to said operating member to produce a variable output;

drive control means responsive to said pressing force detecting means for outputting a drive signal to said actuator; and drive signal outputting means for comparing an output of said pressing force detecting means with a predetermined value to output a drive signal for driving said actuator when said predetermined value is exceeded by the output of said pressing force detecting means, said drive signal outputting means, when any movement of said photo-taking lens is not detected by said movement detecting means while said drive signal outputting means is outputting a drive signal, outputting a drive signal higher that said drive signal in driving power.

30. The lens driving device according to claim 29, further comprising an EEPROM storing said predetermined value.

31. The lens driving device according to claim 29, in which said drive signal outputting means outputs a drive signal in which a constant $\beta$ is added to said drive signal in outputting said drive signal high in driving power.

32. The lens driving device according to claim 31, in which said constant $\beta$ is stored in said EEPROM.

33. A camera lens driving device comprising:

a zoom lens with a variable focal length;

a motor for driving said zoom lens;

an operating switch for instructing said motor to drive said zoom lens toward long or short focal length side;

a pressure sensitive element responsive to pressing force by an operator to said operating member for producing a variable output;

comparator means for comparing an output of said pressure sensitive element with first and second predetermined values; and motor drive control means responsive to said comparator means for driving said motor with a first predetermined voltage when the output of said pressure sensitive element is less than said first predetermined value, driving said motor with a voltage corresponding to the output of said pressure sensitive element when the output of said pressure sensitive element is greater than said first predetermined value but less than said second predetermined value, and driving said motor with a second predetermined voltage when the output of said pressure sensitive element is greater than said second predetermined value, and wherein said motor drive control means sets a motor drive voltage on the basis of a product of an input value VAD from said pressure sensitive element and a constant "a" when the input value is greater than said first predetermined value but smaller than said second predetermined value.

34. The lens driving device according to claim 33, in which said pressure sensitive element includes a mixture of a silicon insulating resin and conductive particles, the resistance of which changes with pressing force thereto and the output of which varies with a change in resistance.

35. The lens driving device according to claim 33, in which said comparator means converts the output of said pressure sensitive element to a digital value and compares the digital value with said first and second predetermined values.

36. The lens driving device according to claim 35, in which said drive control means sets a motor drive voltage in steps in accordance with an input value from said pressure sensitive element when the input value is greater than said first predetermined value but smaller than said second predetermined value.

37. The lens driving device according to claim 33, in which said comparator means, when the output of said pressure sensitive element is smaller than a third predetermined value smaller than said first predetermined value, decides that said operating member is in the off state.

38. The lens driving device according to claim 33, in which said operating switch comprises an up switch for driving said zoom lens toward the long focal length side and a down switch for driving said zoom lens toward the short focal length side.

39. A camera lens driving device comprising:

a motor for driving a photo-taking lens;

an operating switch for instructing said motor to drive said lens in a specific direction, said operating switch including a pressure sensitive element for producing a variable output according to pressing force applied thereto by a camera operator;

comparator means for comparing an output value of said pressure sensitive element with first and second predetermined values; and motor drive control means responsive to said comparator means for driving said motor at a first constant speed when said output value is smaller than said first predetermined value, driving said motor at a speed corresponding to said output value when said output value is larger than said first predetermined value but smaller than said second predetermined value, and driving said motor at a second constant speed when said output value is larger than said second predetermined value, and wherein said motor drive control means sets a motor drive voltage on the basis of a product of an output value VAD from said pressure sensitive element and a constant "a" when the output value is greater than said first predetermined value but smaller than said second predetermined value.

40. The lens driving device according to claim 39, in which said pressure sensitive element has a resistance which is changed according to pressing force applied thereto by said operator, thereby changing the output of said pressure sensitive element.

41. The lens driving device according to claim 39, in which said drive control means sets a motor drive voltage in steps in accordance with an output value from said pressure sensitive element when the output value is greater than said first predetermined value but smaller than said second predetermined value.

42. The lens driving device according to claim 39, in which said drive control means, when the output of said pressure sensitive element is smaller than a third predetermined value which is smaller than said first predetermined value, decides that said operating switch is in the off state.

43. The camera lens driving device according to claim 39, in which said first and second constant speeds are obtained by driving said motor with constant drive voltages.

44. The camera lens driving device according to claim 39, in which said first and second constant speeds are obtained by driving said motor with pulse voltages having constant duty ratios.

45. A camera driving device comprising:

a motor for driving a camera element;

an operating switch for instructing said motor to drive said camera element in a specific direction, said operating switch including a pressure sensitive element for producing a variable output according to pressing force applied thereto by a camera operator;

first comparator means for comparing an output value of said pressure sensitive element with a first predetermined value;

motor drive control means responsive to said comparator means for driving said motor at a first constant speed when said output value is smaller than said first predetermined value, and driving said motor at a speed corresponding to said output value when said output value is larger than said first predetermined value but smaller than said second predetermined value; and second comparator means for comparing said output value with a second predetermined value;

wherein said drive control means drives said motor at a second constant speed when said output value is larger than said second predetermined value.

46. The camera driving device according to claim 45, further comprising storage means for storing said second predetermined value.

47. The camera driving device according to claim 45, in which said camera element is a photo-taking lens.

48. The lens driving device according to claim 45, in which said pressure sensitive element has a resistance which is changed according to pressing force applied thereto by said operator, thereby changing the output of said pressure sensitive element.

49. The camera driving device according to claim 45, further comprising storage means for storing said first predetermined value.

50. A camera driving device comprising:

a motor for driving a camera element;

an operating switch for instructing said motor to drive said camera element in a specific direction, said operating switch including a pressure sensitive element for producing a variable output according to pressing force applied thereto by a camera operator;

comparator means for comparing an output value of said pressure sensitive element with a predetermined value; and motor drive control means responsive to said comparator means for driving said motor at a speed corresponding to said output value when said output value is smaller than said predetermined value and driving said motor at a second constant speed when said output value is larger than said predetermined value.

51. The camera driving device according to claim 50, in which said camera element is a photo-taking lens.

52. The lens driving device according to claim 50, in which said pressure sensitive element includes a mixture of a silicon insulating resin and conductive particles and has its resistance changed according to pressing force applied thereto by said operator, thereby changing its output.

53. The camera driving device according to claim 50, further comprising storage means for storing said predetermined value.

54. A camera driving device comprising:

a motor for driving a camera element;

an operating switch for instructing said motor to drive said camera element in a specific direction, said operating switch including a pressure sensitive element which produces a variable output responsive to a pressing force of an operator;

a comparator for comparing the output from said pressure sensitive element with first, second and third predetermined values, respectively; and drive control means responsive to said comparator, for causing said motor to remain stopped when the output of said pressure sensitive element is smaller than said first predetermined value, for driving said motor at a first constant speed irrespectively of the output of said pressure sensitive element when the output of said pressure sensitive element is larger than said first predetermined value and is smaller than said second predetermined value, for driving said motor at a speed responsive to the output of said pressure sensitive element when the output of said pressure sensitive element is larger than said second predetermined value and is smaller than said third predetermined value, and for driving said motor at a second constant speed when the output of said pressure sensitive element is larger than said third predetermined value.

55. A camera driving device according to claim 54, further comprising an analog-to-digital converter which converts an analog output from said pressure sensitive element to a digital output.

56. A camera driving device according to claim 54, wherein:

the camera includes a zoom lens; and said operating means comprises a switch used for changing a focal length of the zoom lens.

* * * * *